United States Patent [19]

Mansson et al.

[11] 3,854,085

[45] Dec. 10, 1974

[54] MULTI-PROBE FLUX LEAKAGE TESTING APPARATUS PRODUCING BIPOLAR SIGNALS FROM THE LARGEST SIMULTANEOUSLY OCCURRING SIGNALS OF EACH POLARITY

[75] Inventors: Sven E. Mansson, Hollviksnas, Sweden; Paul J. Bebick, Bronx; Edward D. Spierer, Belle Harbor, both of N.Y.

[73] Assignee: Magnetics Analysis Corporation, Mt. Vernon, N.Y.

[22] Filed: June 7, 1973

[21] Appl. No.: 367,883

[52] U.S. Cl. .................................................. 324/37
[51] Int. Cl. ............................................ G01r 33/12
[58] Field of Search ................................. 324/37, 40

[56] References Cited
UNITED STATES PATENTS

| | | | |
|---|---|---|---|
| 2,889,514 | 6/1959 | Cowan et al. | 324/37 |
| 2,958,818 | 11/1960 | Cowan et al. | 324/37 |
| 3,528,003 | 9/1970 | Forster | 324/37 |
| 3,612,987 | 10/1971 | Placke | 324/37 |
| 3,670,239 | 6/1972 | Shiraiwa | 324/37 |

FOREIGN PATENTS OR APPLICATIONS

| | | | |
|---|---|---|---|
| 465,638 | 2/1971 | Japan | 324/37 |

*Primary Examiner*—Robert J. Corcoran
*Attorney, Agent, or Firm*—Pennie & Edmonds

[57] ABSTRACT

In non-destructive testing apparatus of the magnetic flux-leakage type, a plurality of probes simultaneously scan different portions of an object passing thereby. Each probe produces a flaw signal having positive and negative excursions, and is prefereably a U-shaped core with a coil wound therearound. The probe outputs are amplified and the positive and negative portions separately rectified and combined to yield respective signals corresponding to the largest positive and negative signals simultaneously occurring in the probes. Advantageously diode rectifiers poled in opposite directions are employed, with the outputs of similarly poled diodes connected together so that the largest signals of each polarity back-bias the remaining diodes to eliminate noise therefrom. The aforesaid largest signals are added and supplied to a pair of indicating channels containing bandpass filters adapted to pass different frequency ranges of the flaw signals. Advantageously the probes, adder and intervening circuits are mounted on a rotating head, the processing enabling a considerable number of probes to be employed while requiring a considerable number of probes to be employed while requiring only a single output collector ring, and a pair of rings for supplying operating voltages to the circuits on the rotating head.

12 Claims, 11 Drawing Figures

3,854,085

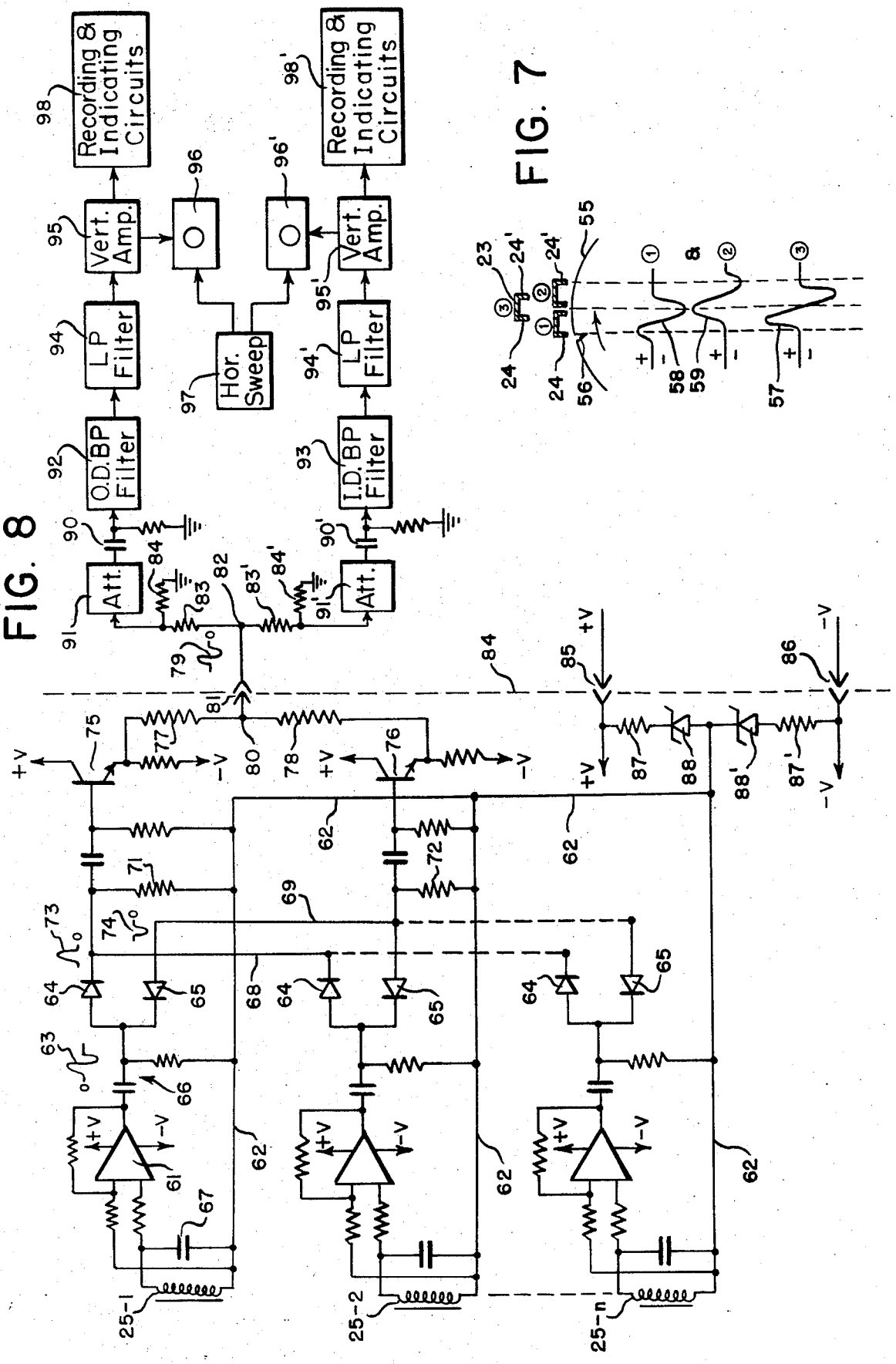

MULTI-PROBE FLUX LEAKAGE TESTING APPARATUS PRODUCING BIPOLAR SIGNALS FROM THE LARGEST SIMULTANEOUSLY OCCURRING SIGNALS OF EACH POLARITY

BACKGROUND OF THE INVENTION

Non-destructive testing apparatus of the flux-leakage type is well-known in which a magnetic field is applied to an object under test, and leakage flux due to flaws in the object detected by a suitable probe. The output of the probe is amplified, filtered and processed by suitable circuits to indicate the presence of flaws. In general, the object and probe are moved relatively to each other so that the probe successively scans different portions of the object to determine the presence or absence of leakage flux.

Small probes are desirable to detect small flaws, but increase the time required to scan all portions of an object. A plurality of probes, each with its own processing channel, has been employed. This decreases the overall testing time but becomes quite expensive as the number of probes and channels are increased, and also involves problems in setting up all channels for equal gains, etc. so that all flaw signals are equally processed regardless of the channels in which they occur.

Connecting a number of probes to the input of a single channel is subject to the serious disadvantage that each probe loads the channel and contributes to the noise therein, thus reducing the signal-to-noise ratio. This greatly reduces the sensitivity of the apparatus to small flaws.

It has been proposed to use a high frequency electromagnet with magneto-sensitive diodes and differential amplification of pairs of diodes to cancel noise. The differential outputs are demodulated, and demodulated signals of one polarity combined so that the largest signal of that polarity occurring at a given instant is selected and used for further processing and indication. Apart from the complexity and expense of such apparatus, problems may arise if an object is off-center with respect to the probes, and subsequent filtering to determine, for example, whether flaws are on the inside or outside of a tube may be difficult if not impossible.

The present invention is directed to a multi-probe flux-leakage testing apparatus using a steady state magnetic field in which the outputs of the probes are processed to yield signals having positive and negative portions corresponding to the largest positive and negative portions simultaneously occurring in the several probes. The resultant signals may be subsequently processed in one or more channels while preserving a large signal-to-noise ratio, off-center problems are reduced, and filtering to extract desired flaw information is facilitated. Further, the invention includes mounting the probes and processing circuits on a rotating head in such a manner that only a few rotary connections such as collector or slip rings are required.

SUMMARY OF THE INVENTION

In accordance with the invention, a steady state magnetic field is produced in the test region of an object under test, and a plurality of spaced leakage-flux probes produce respective signal outputs having positive and negative portions corresponding to flaws passing thereby in the test region. A permanent magnet may be used to produce the steady state magnetic field, and each probe advantageously comprises a magnetic core having spaced legs with a coil encircling the core.

Means are provided for separately rectifying and combining the positive and negative portions of the signals from the probes to yield respective signals corresponding to the largest signal of each polarity simultaneously occurring in the probes. These largest positive and negative signals are then added and the resultant supplied to a suitable processing channel or channels for producing flaw indications, etc.

Advantageously the outputs of the probes are separately amplified and the output of each amplifier supplied to a pair of oppositely poled rectifiers, preferably diodes, so as to separately clip positive and negative peaks of the amplified probe signals. A pair of connections are connected respectively to the outputs of similarly-poled rectifiers, and the largest signal of each polarity simultaneously occurring in the respective connection back-biases the remaining rectifiers so that they become non-conducting and hence do not contribute to the noise in the connections or present any load on the conducting rectifiers. The signals in the pair of connections are then supplied to an adder circuit to produce resultant signals having positive and negative excursions as they occur.

By using both positive and negative portions of the probe signals to produce the resultant signals, failure to detect flaws when an object is off-center with respect to the probes is largely avoided. Such off-centering may increase the positive excursions and reduce the negative excursions, or vice versa, and in either case the larger excursions will be detected even though the smaller excursions may not be. Furthermore, the bipolarity of the resultant signals permits convenient filtering to be employed to obtain more complete information concerning flaws, as will be explained hereinafter.

In testing generally cylindrical objects such as tubes and rods, it is preferred to pass the objects through a rotating head, with the probes mounted on the head. This requires rotating means such as collector or slip rings to supply the probe signals to the processing channels. Such devices may be quite expensive in order to avoid introducing noise and to perform satisfactorily for long periods of time under adverse operating conditions such as in rolling mills, etc. Hence, if individual signals from a number of probes are brought out, a considerable increase in the cost of the apparatus results.

In accordance with one aspect of the present invention, the probes, amplifiers, rectifiers and adding circuits are all mounted on the rotating head, so that only one slip ring, or the equivalent thereof, is required for the aforesaid resultant signals. Another pair of rings supplies power to the amplifiers on the rotating head. Thus excessive cost is avoided while allowing any reasonable number of probes to be used.

BRIEF DESCRIPTION OF THE DRAWINGS

FIG. 7 shows examples of probe waveforms under center and off-center conditions; and FIG. 8 is a circuit diagram of processing circuits in accordance with the invention.

DESCRIPTION OF THE SPECIFIC EMBODIMENTS

Figure 1A:
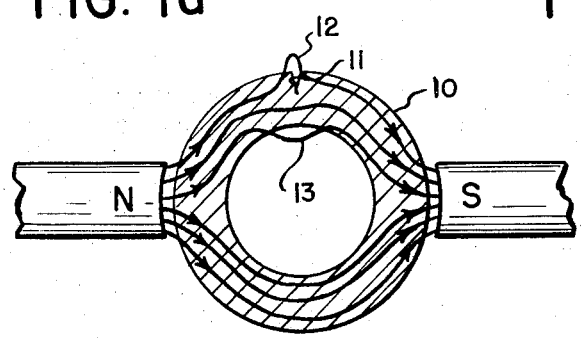
FIGS. 1a and 1b illustrate flux leakage from O.D. and I.D. flaws of a tube.
Figure 1C:
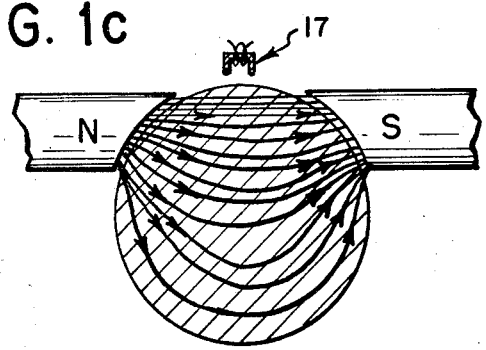
FIG. 1c illustrates offsetting of the magnetic poles for a solid rod.
Figure 1B:
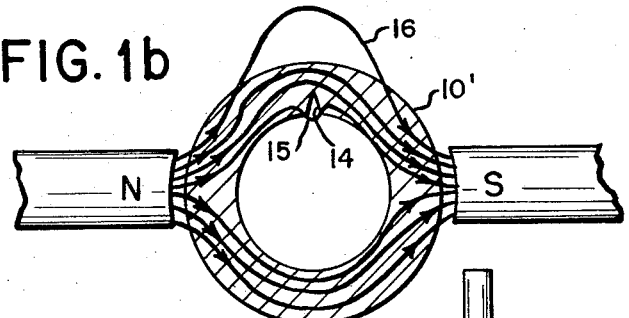

FIG. 1a illustrates a tube 10 of magnetic material across which a steady state magnetic field is produced by a magnet having poles N and S. In the absence of flaws, most of the flux will pass through the tube. In the presence of a flaw, here shown as an O.D. (outside diameter) flaw 11, the discontinuity results in an external leakage flux adjacent the flaw as shown at 12. There may also be some internal leakage flux as shown at 13. FIG. 1b shows a tube 10' with an I.D. (inside diameter) flaw 14. There will be some internal leakage flux 15, and some external leakage flux 16. As will be observed from 12 and 16, an O.D. flaw will produce a narrower, more concentrated external leakage flux pattern than an I.D. flaw. The actual flux patterns will depend on the size and depth of the flaws, and may differ from those shown. However, with adequate sensitivity in the testing apparatus, it is possible to detect both O.D. and I.D. flaws in many cases of practical importance by using external probes. In such cases the probe signal will be of longer duration for an I.D. flaw.

If solid rods are to be tested, the diametric arrangement of poles N and S may result in most of the flux passing through the rod directly between the poles, with a low flux concentration halfway between the poles at the periphery of the rod, where a probe is commonly placed. FIG. 1c shows the magnetic poles spaced less than 180° apart, so that more flux is concentrated in the portion of the rod directly beneath probe 17. Thus any flaws in the rod will produce more leakage flux at the probe, and increase the sensitivity of detection.

Figure 2A:
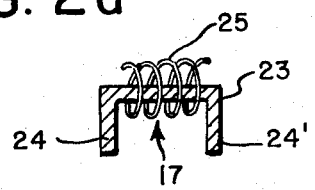
FIG. 2 illustrates a fixed multi-probe assembly and FIG. 2a illustrates a single probe thereof.
Figure 2:
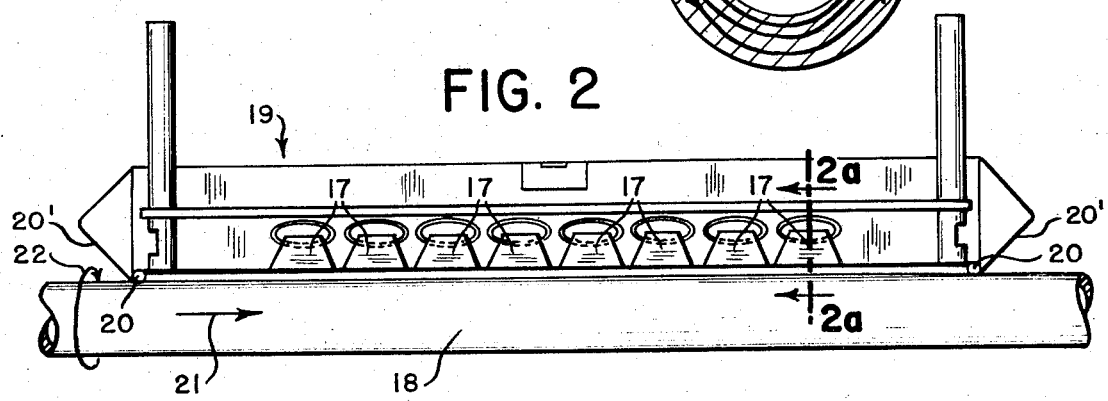

FIG. 2 shows a multi-probe arrangement in which a series of individual probes 17 are linearly spaced along the path of travel of an object 18 to be tested. The probes are mounted in a suitable frame 19 and may be encapsulated to form a sturdy structure. Object 18 may be a tube or rod and supported and driven by suitable means (not shown) in the longitudinal direction indicated by arrow 21 and rotated as shown by arrow 22. Accordingly probes 17 scan respective helical paths of the object. A magnet (not shown) produces a magnetic field perpendicular to the plane of the drawing throughout the region encompassed by the probe assembly, in the manner illustrated in FIG. 1. Depending on the number of flaws in the object, and their positions, one or more probes may simultaneously detect flaws. In such case, the largest of simultaneously detected flaws will commonly be of greatest significance.

FIG. 2a illustrates an individual probe having a core 23 of magnetic material such as mumetal, formed in a U-shape to provide a pair of spaced legs 24, 24'. A coil 25 encircles the core. As seen in FIG. 2, the legs may have a trapezoidal shape so that the probes can be closely spaced while providing room for the coils. The legs of each probe are circumferentially spaced with respect to object 18. The manner in which the probe outputs are combined will be described later in connection with FIG. 8.

The probe assembly may be mounted by suitable means (not shown) allowing vertical movement to accommodate variations in the diameter of object 18. Desirably there is a small air gap between the legs of the probes and object 18 to reduce pickup noise, and this may be established by shoes 20 of a long-wearing material such as carbide. The ends of the assembly may also be provided with lifting ramps 20' so that an entering object will force the assembly upwards, if required, and avoid damage.

FIGS. 3–6 illustrate a rotating head arrangement which is usually more convenient than the fixed arrangement of FIG. 2 when tubing and bar stock is to be tested, since the object 31 requires only longitudinal movement which can be produced by conventional conveyers such as rollers. A fixed back plate 32 has a hub 33 affixed thereto, and the hub carries a set of bearings 34 on which the head generally designated 35 rotates. The head may be driven by a motor and belt (not shown), the belt engaging in groove 36. Various parts of the fixed and rotating structures are held together by bolts, etc., but these are omitted for the most part to avoid complicating the drawings.

Figure 5:
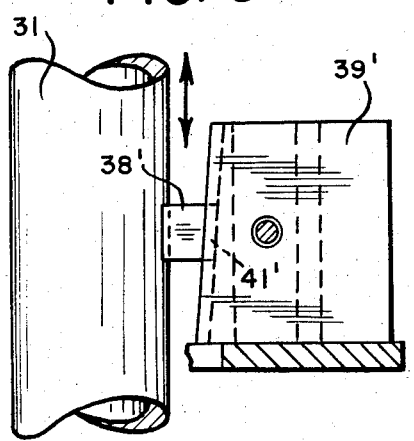
FIG. 5 is a detail taken along the line 5—5 of FIG. 3.

A permanent magnet is mounted on the rotating head and is here shown as a pair of half-cylinders 37, 37' between which pole pieces 38, 38' are held by clamping members 39, 39' forming part of the magnet structure. Dove-tail and groove connections 41, 41' between the pole pieces and clamping members, with the grooves inclined to the axis of rotation, as best seen in FIG. 5, allow the pole pieces to be adjusted with respect to the axis to accommodate different diameter pieces. The clamping members are slotted so that the pole pieces can be held in the desired positions by tightening the nuts on bolts 42, 42'. The bolts pass through ears of the magnet and through the clamping members.

A tapered member 43 is also attached to the rotating head for mounting the probe carriers 44, 44' in inclined dove-tail and groove manner similarly to the pole pieces, to allow adjustment for different diameter pieces. Suitable locking means is provided such as a split dove-tail and an expansion screw. In this embodiment each probe carrier supports a probe cartridge 45, 45' by means of lever arms 46, 46', and the cartridges have projections 47, 47' thereon serving as lifting ramps and riding shoes. Thus, if the space between the probe cartridges is less than the diameter of piece 31, as the piece enters it will strike the ramps and move the cartridges outward to avoid damage. Thereafter the cartridges will be maintained in contact with piece 31 by compression springs 48, and the probes will scan the material with a fixed air gap.

Each cartridge 45, 45' contains a desired number of probes of the type shown in FIGS. 2 and 2a, spaced axially of the rotating head. If desired, only one cartridge may be employed and the desired number of probes mounted therein, particularly if the magnet arrangement of FIG. 1c is employed. As here shown, each cartridge contains two probes so that the tube 31 is scanned in four helical paths.

Figure 6:
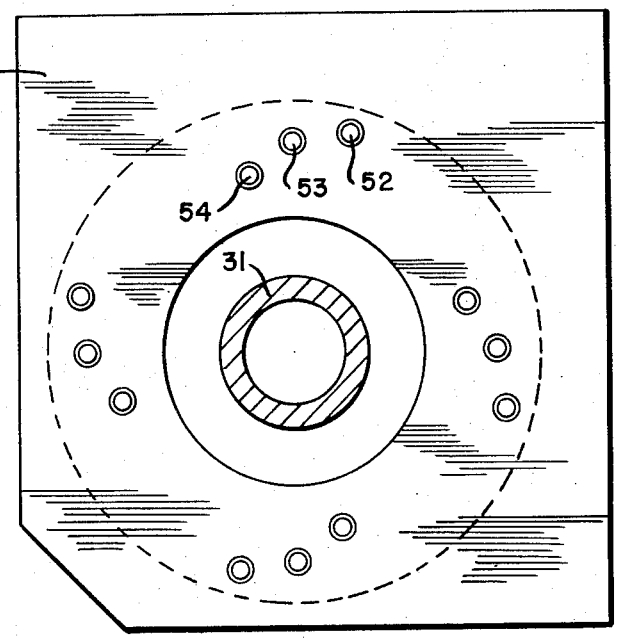
FIG. 6 is a face view taken from the right of FIG. 4.
Figure 3:
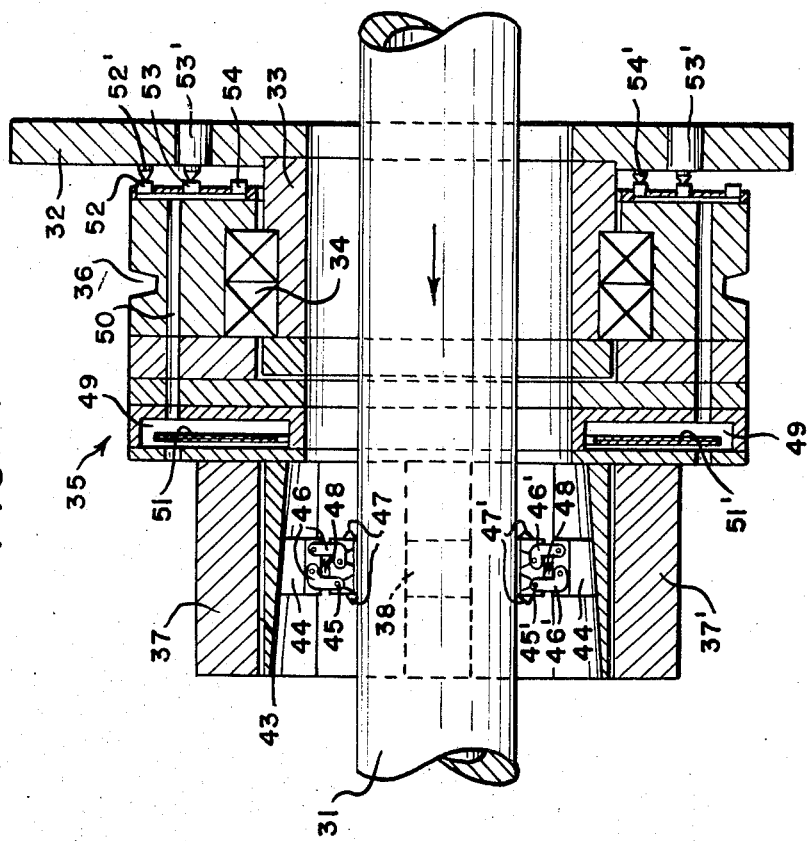
FIG. 3 is a face view of a rotating flux-leakage testing head taken from the left of FIG. 4.
Figure 4:
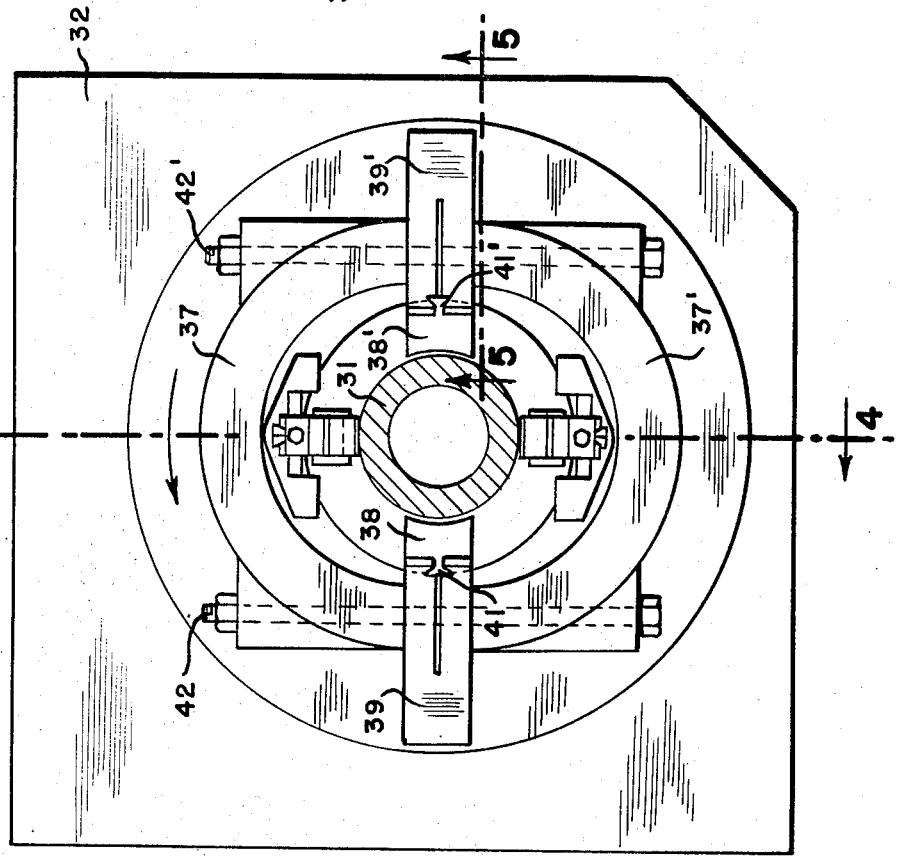
FIG. 4 is a cross-section along the line 4—4 of FIG. 3.

An annular space 49 in the rotating head supports circuit cards 51, 51' on which circuit components are mounted as described in connection with FIG. 8. Slip rings 52–54 are mounted on the rotating head and are contacted by respective brush assemblies 52', 54' in the stationary back plate 32. Interconnecting wires between cards 51—51' and slip rings 52-54 are run through a small circular void 50 machined through the rotating head 35. As seen in FIG. 6, four sets of brush assemblies are spaced around the slip rings to assure low resistance connections.

Referring to FIG. 7, a probe such as shown in FIG. 2a, but represented only by its core 23, is shown in opposite offcenter positions 1 and 2 and in a center position 3 with respect to a rotating object containing a flaw 56. In the centered position 3, the two legs 24, 24' will be equidistant from object 55. Although here shown displaced radially to avoid obscuring the drawing, the legs are preferably as close to the object as conveniently can be arranged, to promote sensitivity. As the flaw 56 passes leg 24, a signal excursion in one direction will be produced in the associated coil 25 shown in FIG. 2a, and as the flaw passes the other leg 24' a signal excursion in the opposite direction will be produced. The polarities will depend on the direction of coil winding and its circuit connections. It is here assumed that the initial excursion is positive and the other negative, as shown by waveform 57. Depending on the size of the probe and the flaw, waveform 57 may approximate a single sinusoidal cycle, or the excursions may be closer together or farther apart. In the latter cases a fairly strong sinusoidal component will commonly exist. Depending on the axial length of the flaw, probe signals may be produced on successive revolutions of the object. Usually the duration of a flaw signal is small compared to the time separation of successive flaw signals.

If the probe is off-center to the left, in position 1, the leading leg 24 will be farther from the object than the trailing leg, so that the initial excursion will have a smaller amplitude than the other, as indicated by waveform 58. The opposite will be true for off-center position 2 to the right, as indicated by waveform 59. Thus, if only excursions of one polarity were used to detect flaws, a sizable flaw might yield only a small excursion of that polarity and fail to be indicated as a significant flaw by the subsequent circuitry.

Referring to FIG. 8, probe coils 25-1, 25-2........25-n represent the number of probes used in a given application. The output of probe 25-1 is amplified by a bipolar class A amplifier 61, here shown as an operational amplifier supplied with +V and −V with respect to the reference potential of line 62. The flaw signal output indicated at 63 is supplied to a pair of oppositely poled rectifiers here shown as diodes 64, 65. The RC coupling circuit 66 may be designed to filter out extraneous low frequencies. Capacitor 67 may be used to bypass extraneous high frequency transients. The circuits for the other probes are the same.

Positively-poled diodes 64 from all the probe channels are connected together by line 68, and negatively-poled diodes 65 are connected by line 69. Each set of diodes is returned to reference line 62 through respective resistors 71, 72. Thus the diodes 64, 65 act as negative and positive signal clippers, yielding positive signal portions in line 68 as indicated at 73, and negative signal portions in line 69 as indicated at 74.

The circuit functions to produce in lines 68, 69 only the largest positive and negative signals simultaneously applied to respective sets of diodes, and all diodes except those passing these largest signals are back-biased so that they become essentially open circuits and do not contribute noise in the connecting lines or present any load on the conducting diodes. First assume that only probe 25-1 is producing a flaw signal. The corresponding positive excursion 73 from diode 64 in the upper channel will back bias all the other diodes 64 connected to line 68. Similarly, the negative excursion 74 from diode 65 in the upper channel will back bias all the other diodes 65 connected to line 69. Now assume that flaw signals are being produced simultaneously by several probes. The diode 64 which produces the largest positive excursion in line 68 will back bias all the other diodes 64, and similarly for the largest negative excursion in line 69. As the probes produce flaw signals occurring at different instants in time, only the largest positive signal occurring at any one instant will be passed, and only the largest negative signal occurring at any one instant will be passed, with time differences the same as their original time differences.

The signals in lines 68, 69 are supplied to transistors 75, 76 forming an adder circuit. The transistors are connected as emitter followers with respective output resistors 77, 78 connected together. The adder circuit combines the largest positive and negative signals occurring at corresponding instants in lines 68, 69 to form a bipolar signal 79 at the junction point 80. As positive and negative signals occur in lines 68, 69 at different instants in time, they are added to a zero voltage base to form corresponding bipolar signals. These bipolar signals are usually found to be approximately single sinusoidal cycles, or at least contain fairly strong sinusoidal components, thereby enabling useful filtering as will be described later.

In the event that the positive signal applied to transistor 75 is considerably smaller than the negative signal supplied to transistor 76, the resultant added signal at point 80 will be similar to waveform 58 in FIG. 7, disregarding contact potentials of diodes 64 and 65. Vice versa, the signal at point 80 will be similar to waveform 59 in FIG. 7. Subsequent circuits will commonly include capacitor couplings which will eliminate the DC components, for example as shown at 90, 90', so that the waveforms will contain substantial sinusoidal components and can be filtered conveniently as required.

When used with the rotary head embodiment of FIGS. 3–6, all components to the left of the dash line 84 may be carried by the rotating head 35. The mounting of the probes has already been described, and the circuit components may be carried on cards 51, 51' in the annular space 49 of FIG. 4. The added signals at point 80 are supplied through a slip ring indicated by the symbol 81 to a connection 82 on stationary mounting means for the head.

In the bipolar arrangement shown, equal plus and minus voltages are required for the amplifiers, and are supplied thereto through slip rings indicated by symbols 85, 86. Another slip ring could be employed to supply a common ground connection to the rotating head. However, here the need for another slip ring is avoided by developing a virtual ground. To this end, a series circuit including equal resistors 87, 87' and similar Zener diodes 88, 88' is connected from +V to −V, thereby producing a virtual ground for line 62. Thus only three slip rings are required regardless of the number of probes used.

Flaw signals at point 82 may be supplied to one or more processing channels for indication, including recording and sorting as desired in accordance with conventional practice. Here, all signals are supplied to two independent processing channel inputs, each of which contains a series resistor 83, 83' and a shunt resistor 84, 84' used in combination to establish relative initial signal level control for each channel. Usage of two channels enables separation of O.D. and I.D. flaws.

Each channel includes an attenuator 91, 91' for adjusting the sensitivity. The upper channel includes a bandpass filter 92 covering the band of frequencies expected to be produced by O.D. flaws. The lower channel includes a bandpass filter 93 covering the band of frequencies expected to be produced by I.D. flaws. The frequencies for I.D. flaws are commonly considerably lower than those for O.D. flaws since, as shown in FIGS. 1a and 1b, the leakage flux fields of I.D. flaws will commonly be broader than those of O.D. flaws. Each bandpass filter may be designed to provide several selectable bandpass regions to meet the requirements of different applications.

Such bandpass filters commonly have R-C low frequency and high frequency cut-off circuits, both for convenience and because L-C filters are likely to ring after the application of a single excitation. With R-C filters the low frequency cutoff has a differentiating configuration and the high frequency cutoff has an integrating configuration. Consequently it has been found that when pulses of one polarity are applied to the filters, differentiation and integration problems are present which seriously obscure meaningful flaw information. In particular, differentiation may drastically change the amplitudes of the flaw signals so that correlation of the resultant signals with the size of the flaws is greatly impaired, if not destroyed.

By utilizing both positive and negative excursions to produce the resultant signal 79 at point 80, normal filtering is possible so as to retain both frequency and amplitude information concerning the flaws.

Low pass filters 94, 94' may be provided to eliminate high frequency transients unrelated to or not necessary for flaw detection. The resultant flaw signals are amplified in 95, 95' and supplied to the vertical deflection circuits of oscilloscopes 96, 96'. Suitable horizontal sweeps are supplied to the oscilloscopes from 97. Thus O.D. and I.D. flaws may be separately observed.

The outputs of amplifier 95, 95' may be supplied to recording and indicating circuits 98, 98' in accordance with conventional practice, and these circuits may include threshold circuits actuating an alarm, marker or segregator whenever either the positive or negative portions exceed a predetermined value.

The specific embodiments show testing generally cylindrical objects. It is also possible to test flat plates, etc., although the mechanical arrangements may become complicated. In such cases the ability to scan a considerable number of paths simultaneously may facilitate testing.

The invention has been described in connection with specific embodiments thereof. It will be understood that changes may be made within the spirit and scope of the invention, as deemed desirable to meet the requirements of a particular application.

We claim:

1. Multi-probe flux leakage testing apparatus for detecting flaws in an object relatively moving with respect to the probes which comprises
   a. means for producing a steady state magnetic field in said object in the test region thereof,
   b. a plurality of spaced leakage-flux probes for producing respective signal outputs having positive and negative excursions corresponding to flaws passing thereby in said test region,
   c. means for rectifying and combining the positive portions of the signals from said probes and rectifying and combining the negative portions of the signals from said probes to yield positive and negative signals corresponding to the largest signal of each polarity simultaneously occurring in said probes,
   d. adding means for adding said largest positive and negative signals to yield bipolar signals having corresponding positive and negative excursions,
   e. and circuit means responsive to said bipolar signals for indicating flaws in a said object.

2. Apparatus according to claim 1 in which said probes each include a magnetic core having spaced legs and a coil encircling the core for producing said signal outputs.

3. Apparatus according to claim 1 in which said circuit means includes a pair of channels supplied with said bipolar signals, said channels including respective bandpass filters for selecting different frequency ranges of said bipolar signals.

4. Apparatus according to claim 1 in which said means for separately rectifying and combining includes a plurality of amplifiers for amplifying the outputs of said probes respectively, respective pairs of oppositely poled rectifiers supplied with the outputs of respective amplifiers, and a pair of connections respectively connecting the outputs of similarly poled rectifiers of said pairs of rectifiers, said pair of connections supplying respective positive and negative excursions of the amplified flaw signals to said adding means.

5. Apparatus according to claim 4 in which said rectifiers are diodes.

6. Multi-probe flux leakage testing apparatus for detecting flaws in an object relatively moving with respect to the probes which comprises
   a. means for producing a steady state magnetic field in said object in the test region thereof,
   b. a plurality of spaced leakage-flux probes for producing respective signal outputs having positive and negative excursions corresponding to flaws passing thereby in said test region,
   c. said probes each including a magnetic core having spaced legs and a coil encircling the core for producing said signal outputs,
   d. a plurality of amplifiers connected to said coils respectively,
   e. respective pairs of oppositely poled diodes supplied with the outputs of respective amplifiers,
   f. a pair of connections respectively connecting the outputs of similarly poled diodes of said pairs of diodes to yield respective positive and negative signals corresponding to the largest signals of each polarity simultaneously supplied to said diodes,
   g. adding means supplied from said pair of connections for adding said largest positive and negative signals to yield bipolar signals having corresponding positive and negative excursions, h. and circuit means responsive to said bipolar signals for indicating flaws in a said object.

7. Apparatus according to claim 6 in which said circuit means includes a pair of channels including respective bandpass filters for selecting different frequency ranges of the bipolar signals.

8. Multi-probe flux leakage testing apparatus for detecting flaws in an object including mounting means carrying a rotating head through which said object is fed, said apparatus comprising
   a. a magnet mounted on said rotating head for producing a steady state magnetic field transverse of an object passing therethrough,
   b. a plurality of leakage flux probes mounted on said rotating head for producing respective signal outputs having positive and negative excursions corresponding to flaws passing thereby,
   c. said probes being spaced to simultaneously scan different portions of an object passing through the head,
   d. means mounted on said rotating head for rectifying and combining the positive portions of the signals from said probes and rectifying and combining the negative portions of the signals from said probes to yield respective positive and negative signals corresponding to the largest signal of each polarity simultaneously occurring in said probes,
   e. adding means mounted on said rotating head for adding said largest positive and negative signals to yield bipolar signals having corresponding positive and negative excursions,
   f. rotary means for supplying the output of said adding means to a connection on said mounting means,
   g. and circuit means supplied with signals from said connection for indicating flaws in a said object.

9. Apparatus according to claim 8 in which said probes each include a magnetic core having two circumferentially spaced legs and a coil encircling the core for producing said signal outputs, and said means for separately rectifying and combining includes a plurality of amplifiers for amplifying the outputs of said probes respectively, respective pairs of oppositely poled rectifiers supplied with the outputs of respective amplifiers, and a pair of connections respectively connecting the outputs of similarly poled rectifiers of said pairs of rectifiers, said pair of connections supplying respective positive and negative excursions of the amplified flaw signals to said adding means.

10. Apparatus according to claim 9 in which said circuit means includes a pair of channels including respective bandpass filters for selecting different frequency ranges of the bipolar signals.

11. Multi-probe flux leakage testing apparatus for detecting flaws in an object including mounting means carrying a rotating head through which said object is fed, said apparatus comprising
    a. a magnet mounted on said rotating head for producing a steady state magnetic field transverse of an object passing therethrough,
    b. a plurality of leakage-flux probes mounted on said rotating head and spaced to simultaneously scan different portions of said object as it passes through the head,
    c. said probes each including a magnetic core having two circumferentially spaced legs and a coil encircling the core for producing signal outputs having positive and negative excursions corresponding to flaws passing thereby,
    d. a pair of collector rings mounted on said rotating head for supplying positive and negative DC voltages to said rotating head,
    e. means on said rotating head for producing a virtual ground from said voltages,
    f. said probe coils having respective one ends thereof connected to said virtual ground,
    g. a plurality of amplifiers on said rotating head connected to the other ends of said probe coils, respectively, and supplied with said DC voltages to produce output signals corresponding to flaw signals from said probes,
    h. respective pairs of oppositely poled diodes on said rotating head connected to the outputs of respective amplifiers,
    i. a pair of connections on said rotating head respectively connecting the outputs of similarly poled diodes to yield respective positive and negative signals corresponding to the largest signals of each polarity simultaneously supplied thereto,
    j. adding means on said rotating head supplied from said pair of connections for adding said largest positive and negative signals to yield bipolar signals having corresponding positive and negative excursions,
    k. an output collector ring mounted on said rotating head for supplying the output of said adding means to a connection on said mounting means,
    l. and circuit means supplied with signals from said connection for indicating flaws in a said object.

12. Apparatus according to claim 11 in which said circuit means includes a pair of channels including respective bandpass filters for selecting different frequency ranges of the bipolar signals.

* * * * *